INVENTOR.
Frederick W. Seybold

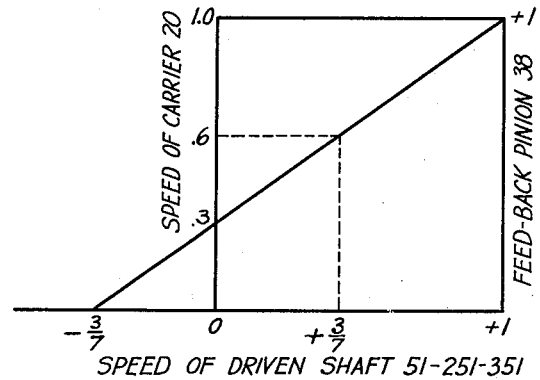

Fig. 4.

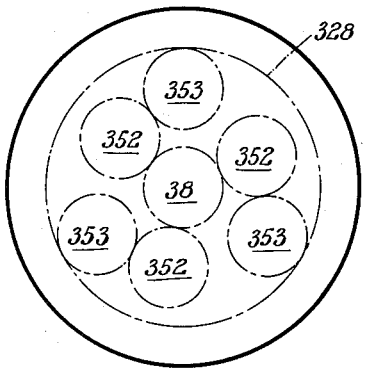

Fig. 5.

| SPEED RATIO | CONVERTER | TRANSMISSION RATIO | CLUTCH ENGAGEMENT | | BRAKE ENGAGEMENT | | TORQUE RATIOS – ENGINE TORQUE = 100 | | | | | | | | | | | ITEM |
|---|---|---|---|---|---|---|---|---|---|---|---|---|---|---|---|---|---|---|
| | | | CLUTCH A | CLUTCH B | BRAKE C | BRAKE D | CONVERTER | CLUTCH A | CLUTCH B | CLUTCH E | INTERNAL GEAR | REACTION GEAR | BRAKE C | BRAKE D | CARRIER | FEED-BACK PINION | OUTPUT SHAFT | |
| LOW | AT STALL | 4.9:1 | OFF | OFF | ON | OFF | 210 | 0 | 0 | 210 | 420 | 280 | 280 | 0 | 700 | 210 | 490 | 26 |
| | AS COUPLING | 2.33:1 | | | | | 100 | 0 | 0 | 100 | 200 | 133 | 133 | 0 | 333 | 100 | 233 | 25 |
| INT. | AT STALL | 3.5:1 | OFF | ON | ON | OFF | 210 | 0 | 150 | 0 | 210 | 140 | 140 | 0 | 500 | 150 | 350 | 24 |
| | AS COUPLING | 1.67:1 | | | | | 100 | 0 | 71.4 | 0 | 100 | 66.6 | 66.6 | 0 | 238 | 71.4 | 167 | 23 |
| DIRECT | AT STALL | 2.1:1 | ON | ON | ON | OFF | 210 | 210 | 300 | 0 | 0 | 0 | 0 | 0 | 300 | 90 | 210 | 22 |
| | AS COUPLING | 1:1 | | | | | 100 | 100 | 143 | 0 | 0 | 0 | 0 | 0 | 143 | 43 | 100 | 21 |
| REV. | AT STALL | -4.9:1 | ON | OFF | OFF | ON | 210 | 210 | 0 | 0 | 0 | 0 | 0 | -700 | -700 | 210 | -490 | 20 |
| | AS COUPLING | -2.33:1 | | | | | 100 | 100 | 0 | 0 | 0 | 0 | 0 | -333 | -333 | 100 | -233 | 19 |
| 1 | 2 | 3 | 4 | 5 | 6 | 7 | 8 | 9 | 10 | 11 | 12 | 13 | 14 | 15 | 16 | 17 | 18 | |

Fig. 6.

INVENTOR.
Frederick W. Seybold

United States Patent Office 2,701,480
Patented Feb. 8, 1955

2,701,480

AUTOMATIC TRANSMISSION

Frederick W. Seybold, New Rochelle, N. Y.

Application February 17, 1953, Serial No. 337,379

20 Claims. (Cl. 74—732)

This invention relates to automatic transmissions particularily applicable to automotive vehicles which require torque multiplication for acceleration of the vehicle from rest or in motion.

Broadly the invention combines a hydro-kinetic torque converter of the simplest type with interconnected planetary gearing, whose elements are controllable by means of clutches and brakes to produce overlapping torque and speed ratios.

It is, therefore, a primary object of this invention to provide a transmission, in which the several control elements are applied successively to advance the transmission from a lower to a higher gear ratio without the simultaneous release of another control element.

Another object of this invention is to provide a transmission which is inexpensive to manufacture, which utilizes the same gearing to produce forward and reverse rotation of the output shaft, and which incorporates the convenience of a no-roll back device.

A further object of this invention is to provide a transmission in which the automatic sequence of application of the control elements may be overruled by the operator of the vehicle to take care of special driving situations, for instance, in passing another vehicle.

A still further object of the invention is to provide means in the transmission to enable the operator to rock the vehicle in snow by the simple manipulation of the control lever.

This invention includes other novel features of construction which make this transmission eminently efficient and practical.

The above objects and advantages will become apparent when reference is made to the description and the accompanying drawings, in which:

Figure 4 shows the speed relation between the driven shaft and other members of the transmission gearing;

Figure 5 is a section of the planetary gearing taken along line 5—5 of Figure 3;

Figure 6 shows the tabulation of the various speed and torque ratios, and the clutch and brake engagements prevailing in the transmission under different operating conditions.

GENERAL ARRANGEMENT

Figure 1:
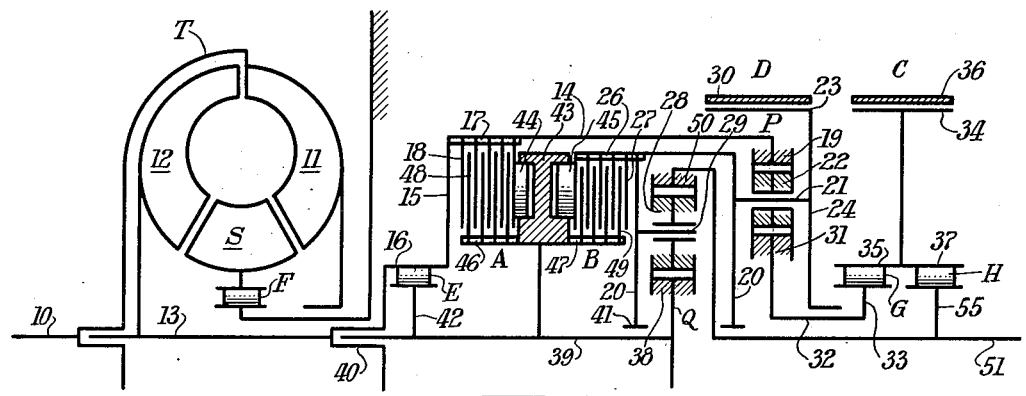
Figure 1 is a diagrammatic vertical, longitudinal section through one form of a power transmission constructed according to my invention.

In general this invention comprises the combination of a simple, three-element hydraulic torque converter having a torque multiplication ratio of about 2.1:1 at stall and planetary gearing controlled by clutches and brakes to provide overlapping speed and torque ratios for the rapid acceleration from rest of a vehicle in which this transmission is installed and finally to attain a 1:1 speed ratio at which time the converter operates as a highly efficient fluid coupling and the planetary gearing is completely locked up.

The converter is composed of a pump driven by the engine and said pump discharges oil into the turbine which is connected to one element of a first planetary gear set. A stator or guide wheel serves as the reaction member of the converter and an overrunning brake prevents reverse rotation of the stator, while accommodating its forward rotation when the reaction torque on the stator vanishes.

There are two interconnected planetary gear sets, each gear set having three elements. A second element of the first gear set is connected to a first element of the second gear set, and said element is further provided with brake means and clutch means. The third element of the first gear set is provided with means for braking it in its reverse direction of rotation only.

A second element of the second gear set is connected to the driven shaft and the third element thereof is provided with overrunning clutch means cooperating with the said first element of the first planetary gear set, and in addition other clutch means are provided to couple said third element to said first element of the first planetary gear set, or to the member common to both gear sets alternately or simultaneously.

The sequence of brake and clutch operation employed in the transmission of this invention is of the type that has become known in the art as "take-away" shifting, as compared with the type known as "cross-over" shifting, in the latter one control element has to be released at the same time another control element is applied, whereas in "take-away" shifting it is not necessary to release any previously applied control member before a second or third control member can be energized.

STRUCTURAL ARRANGEMENT

The transmission designed in accordance with the teaching of this invention can best be understood when it is divided into six assemblies as follows:

1. The driving assembly
2. The reversing assembly
3. The reaction assembly
4. The feed-back assembly
5. The driven assembly
6. The no-roll-back assembly It is to be noted that the three species of the invention illustrated in Figure 1, Figure 2 and Figure 3 differ from each other only in the construction and arrangement of the second planetary gear set. Therefore, identical members found in all three figures are designated by the same reference numerals, and the members of Figure 2, which have a corresponding member in Figure 1 are designated by a reference numeral derived by the addition of 200 to its corresponding reference numeral in Figure 1.

Figure 3:
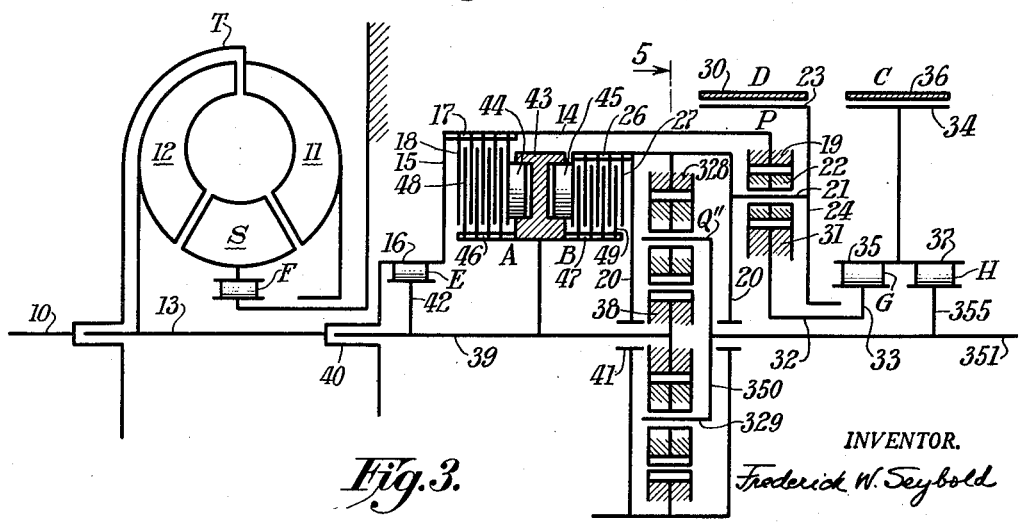
Figure 3 is a diagrammatic vertical, longitudinal section through a third form of a power transmission built according to the teaching of my invention.

Likewise, those members of Figure 3 which have a corresponding member in Figure 1 are designated by a reference numeral derived by the addition of 300 to its corresponding reference numeral in Figure 1.

In the description reference to this deviation in construction will be clearly indicated.

1. *The driving assembly*

The driving assembly comprises the drive shaft 10 which is connected to the pump element 11 of the hydrokinetic torque converter T composed of three elements only. The pump discharges oil into the turbine element 12, which in turn discharges the oil into a stator element S and from there back to the pump 11. An overrunning brake F prevents rotation of the stator S in a direction opposite to that of the drive shaft 10, while rotation in the same direction is accommodated by said brake F.

The turbine 12 is connected to a shaft 13. A long cylindrical shell member 14 having a vertical end face 15 and a hub 16 is fastened in a suitable manner to the shaft 13. The left hand end of member 14 is provided with multiple, internal splines 17 which cooperate with multiple, externally splined friction clutch plates 18. An internal gear 19 of a first planetary gear set P is secured to the right hand end of the member 14.

2. *The reversing assembly*

The reversing assembly comprises the planetary pinion carrier 20 of the first planetary gear set P which is provided with shafts 21 on which are rotatably mounted the planetary pinions 22 which mesh with the internal gear 19. A brake drum 23 is also secured to the carrier 20 and the shafts 21 are also supported by the vertical web 24 of the brake drum 23.

The planetary pinion carrier 20 is further provided with multiple, internal splines 26 with which cooperate the multiple, externally splined friction clutch plates 27.

Figure 1 only: Planetary pinions 28 of gear set Q are rotatably supported on shafts 29 secured in the carrier 20.

Figure 2:
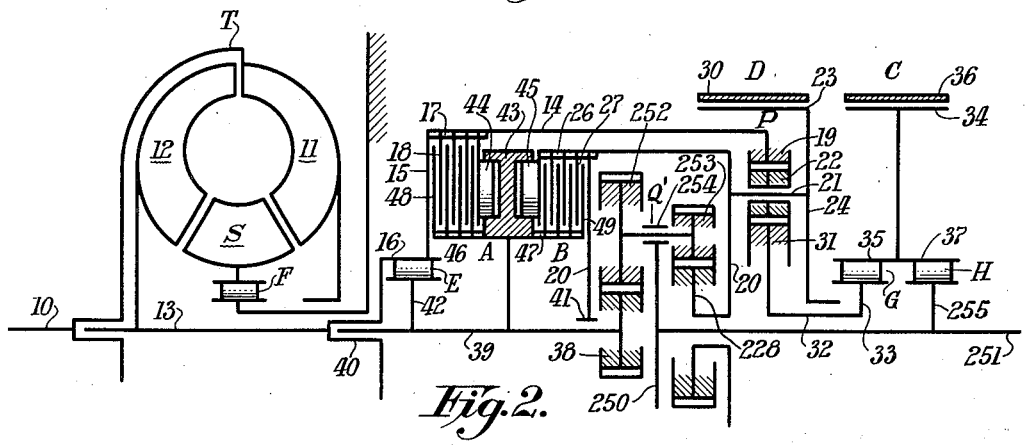
Figure 2 is a diagrammatic vertical, longitudinal section through a second form of a power transmission constructed in accordance with my invention.

Figure 2 only: A sun gear 228 of the gear set Q' is secured to the carrier 20.

Figure 3 only: An internal gear 328 of the second gear set Q" is secured to the carrier 20.

When the assembly 20 is braked by the band 30 on drum 23 and forward power is applied to pinion 38 with clutch A engaged, pinions 28 will turn on the stationary shafts 29 in the reverse direction and as they mesh with the internal gear 50, the latter will also turn in the reverse direction of rotation and cause the driven shaft to turn in the reverse direction. The combination of the brake wheel 23 and the brake band 30 is designated by D.

3. *The reaction assembly*

The reaction assembly comprises the sun gear 31 which is provided with a hub 32 to which the inner member 33 of an overrunning clutch G is secured. Sun gear 31 meshes with the planetary pinions 22 of the planetary gear set P. A brake drum 34 has secured in its bore the outer member 35 of the overrunning clutch G and when a brake band 36 is applied to the brake drum 34 it will prevent reverse rotation of the sun gear 31, while its forward rotation is accommodated by the overrunning clutch G.

The outer member 37 of the overrunning clutch H is also secured in the bore of the brake wheel 34. The combination of the brake wheel 34 and the brake band 36 is designated by C.

4. *The feed-back assembly*

The feed-back assembly comprises the sun gear 38 of the second planetary gear set Q. Sun gear 38 is fastened to a shaft 39 which is journalled respectively at 40 in the shaft 13 and at 41 in the carrier 20. The inner member 42 of the overrunning clutch E is secured to the shaft 39, while its outer member is secured to the hub 16 of the driving assembly.

Clutch E will prevent the feed-back assembly from overrunning the driving assembly and, conversely, the feed-back assembly can be overrun by the driving assembly. Driving torque can, therefore, be applied by the feed-back assembly through the clutch E to the driving assembly, but no torque can be applied by the driving assembly through the clutch E to the feed-back assembly.

Secured to the shaft 39 is the duplex clutch cylinder 43, in which the ring pistons 44 and 45 are respectively mounted for the actuation of the multiple plate clutches A and B.

On opposite sides of the cylinder 43 are provided multiple, external splines 46 and 47 for the reception of mutiple, internally splined friction clutch plates 48 and 49, which, together with the plates 18 and 27, comprise the clutches designated respectively by A and B. Therefore, clutch A connects the feed-back pinion 38 to the driving assembly when the friction plates 18 and 48 are forced together by hydraulic pressure exerted on the ring piston 44. In the same manner, clutch B connects the feed-back pinion 38 to the carrier 20 of the reversing assembly when the friction plates 27 and 49 are clamped together by oil pressure on the ring piston 45.

The oil pressure in cylinder 43 is controlled by a valve arrangement whereby the clutches A and B may be engaged separately or simutlaneously, either by manual or by automatic means. This method of control is well known in the art and is not a part of this invention. Such a method of control is illustrated in my Patent No. 2,658,346. Also the means for conducting pressure fluid to the pistons 44 and 45 is well known in the art and has not been illustrated in the drawings.

5. *The driven assembly*

Figure 1: The driven assembly comprises the internal gear 50 of the second planetary gear set Q, and it is connected to the driven shaft 51. The inner member 55 of the overrunning clutch H is also secured to the driven shaft 51.

Figure 2: The driven assembly comprises the planetary pinion carrier 250 of the second planetary gear set Q' and it is connected to the driven shaft 251. Compound planetary pinions 252, 253 are rotatably mounted in bearings 254 on the carrier 250. Pinions 252 mesh with the feed-back pinion 38 and pinions 253 mesh with the gun gear 228 as shown in Figure 2. The inner member 255 of the overrunning clutch H is also secured to the driven shaft 251.

Figure 3: The driven assembly comprises the planetary pinion carrier 350 of the second planetary gear set Q" and it is fastened to the driven shaft 351. Planetary pinions 352 and 353 Figure 5, are rotatably mounted on shafts 329 secured in carrier 350. Pinions 352 mesh with the feed-back pinion 38 and pinions 353 mesh with the internal gear 328. The inner member 355 of the overrunning clutch H is also secured to the driven shaft 351.

6. *The no-roll-back assembly*

The no-roll-back assembly comprises the overrunning clutch H which cooperates with the brake drum 34, whereby reverse rotation of the driven assembly will be prevented whenever the brake band 36 is applied to the brake drum 34. Reverse rotation of the driven shaft, however, is feasible whenever the brake band 36 is released from the brake drum 34.

This device is a great convenience to the operator when he has to re-start the vehicle on an incline, because it obviates the application or release of the foot brakes as well as the dexterous manipulation of the accelerator at the same time.

OPERATION

A. *Idling or "neutral" operation*

Assuming that the control lever (not shown) has been set in the "neutral" position the brake bands 30 and 36 are respectively released from the brake drums 23 and 34, and clutches A and B are also in their released condition, the driven shaft 51 (251 or 351) remains stationary when the vehicle brakes are applied even with the engine rotating at considerable speed. For the purpose of illustrating the design of the three forms of the invention the following gear proportions have been chosen:

First gear set P—Figures 1, 2 and 3: Teeth
  Sun gear 31 _____ 48
  Planetary pinions 22 _____ 12
  Internal gear 19 _____ 72

Second gear set Q—Figure 1:
  Feed-back pinion 38 _____ 27
  Planetary pinions 28 _____ 18
  Internal gear 50 _____ 63

Second gear set Q'—Figure 2:
  Feed-back pinion 38 _____ 18
  Compound pinion 252 _____ 24
  Compound pinion 253 _____ 12
  Sun gear 228 _____ 30

Second gear set Q"—Figure 3:
  Feed-back pinion 38 _____ 18
  Planetary pinions 352 _____ 18
  Planetary pinions 353 _____ 18
  Internal gear 328 _____ 60

The gear proportions for the three gear sets Q, Q' and Q" as stated above have been so chosen that identical speed and torque ratios result and consequently the values tabulated in Figure 6 serve all three designs shown in Figures 1, 2 and 3.

B. *Forward drive—low*

With the foot brake applied, the operator now will move the control lever to the "low forward" drive position, whereby the brake C will arrest the backward rotation of the sun gear 31. As the engine is speeded up the engine torque will be amplified in the torque converter about 2.1 times.

This amplified torque is transmitted by turbine 12 to the internal gear 19. As the sun gear 31 now serves as a reaction member the carrier 20 will be rotated at a slower speed than the internal gear 19, but it will receive multiplied driving torque from the first planetary gear set P.

Let it be assumed that a forward torque T is impressed on the pinions 28 on shafts 29 of the carrier 20. This torque is divided between the internal gear 50 and the pinion 38, both elements receiving forward torques in an amount depending on their relative size. The internal gear 50 having 63 teeth and the pinion 38 having 27 teeth would then receive $7/10$ T and $3/10$ T respectively. The torque T is generated, however, in the gear set P and the pinions 22 on shafts 21 deliver the torque T to carrier 20.

Internal gear 19 being the input member and sun gear 31 serving as the reaction member (reverse torque) and internal gear 19 having 72 teeth and sun gear 31 having 48 teeth, the division of torque T between internal gear 19 and reaction sun gear 31 is as follows:

Internal gear 19 _____ $9/10$ T
Planet pinions 22 on carrier 20 _____ T
Sun gear 31 _____ $4/10$ T The total input torque of $9/10$ T on internal gear 19 is derived from 210 units of torque from converter turbine 12 and $3/10$ T feed-back torque from pinion 38 to the shaft 39 and added to shaft 13 through the overrunning clutch E, therefore, $9/10$ $T = 210 + 3/10$ $T$
$(9/10 - 3/10)$ $T = 210$
$6/10$ $T = 210$
$T = 700$ (in terms of 100 units of engine torque)

Torque on internal gear 50 or
  shaft 51 _____ $7/10$ $T = 490$ units
Torque of feed-back pinion 38 __ $3/10$ $T = 210$ units
Torque on shaft 13 or internal
  gear 19 _____ $210 + 3/10$ $T = 420$ units
Torque on reaction sun gear 31 _ $-4/10$ $T = -280$ units The driven shaft 51 makes $3/7$ revolution for one revolution of the drive shaft 13, also shaft 39 with feedback pinion 38, see Figure 4, and the carrier 20 makes $6/10$ revolution. Then the power input per revolution from the turbine 12 should equal the power output of the driven shaft 51, neglecting losses.

Input power per rev. 210 units of torque $\times 1$ rev. $=$
    210 units of power
Output power, 490 units of torque $\times 3/7$ rev. $=$
    210 units of power The sun gear 38 receives 210 units of torque and makes one revolution, therefore, the power fed back through clutch E to shaft 13 and internal gear 19 is added to the power furnished by turbine 12, making a total of 420 units of power. The carrier 20, receiving 700 units of torque and making $6/10$ revolution, receives 420 units of power. The sun gear 31 feels a reverse torque of $-280$ units, but since it remains stationary no power is expended. It is now to be observed that in this gear arrangement there is a power circulating in the gear train which is in this case 100% greater than the power delivered by the turbine 12 to the shaft 13.

This condition is sometimes referred to as a regenerative power circuit and it is found in several of the interconnected planetary gear train arrangements.

The planetary pinions 28 of the second planetary gear set Q divide this driving torque of carrier 20 between the internal gear 50 and the feed-back pinion 38, both torques being in the forward direction, hence, if the tooth proportions of gear set Q are as indicated above, the driven shaft 51 will receive $7/10$ T and the feed-back pinion 38 will receive $3/10$ T of the total torque T of the carrier 20.

The torque received by the feed-back pinion 38 will be applied to the internal gear 19 through the overrunning clutch E. The total torque on the internal gear 19 is, therefore, equal to the sum of the converter torque plus the feed-back torque of pinion 38 applied to internal gear 19 through the clutch E.

The reaction torque on sun gear 31 is equal to $2/3$ of the total torque on internal gear 19, if the tooth proportions of gear set P as indicated above prevail.

Hence the total torque T on carrier 20 is the sum of the internal gear torque and the reaction gear torque, and it may be calculated by the formula:

$T =$ converter torque $+ .3T + 2/3$ (converter torque $+ .3T$)
  at stall, converter torque $= 2.1 \times$ engine torque,
$T = 2.1 + .3T + 2/3 (2.1 + .3T)$
  $= 3.5 + .5T$
  $= 7.00 \times$ engine torque When the converter operates as a fluid coupling,
$T = 1 + .3T + 2/3 (1 + .3T)$
  $= 5/3 + .5T$
  $= 10/3$
  $= 3.333 \times$ engine torque.

As previously indicated, the driven shaft 51 receives a torque equal to $7/10$ of the carrier torque T. At stall of the turbine 12 this torque on the driven shaft 51 would be 4.9 times the engine torque, see item column 18, line 26 of Figure 6, and when the converter operates as a fluid coupling the driven or output shaft 51 will receive a torque of 2.33 times the engine torque, see item column 18, line 26 of Figure 6.

To advance the transmission to the next speed ratio, the operator may shift the control valve (not shown) manually into the "intermediate" position, or this may also be accomplished automatically by the combined action of a governor and the accelerator.

C. Forward drive—intermediate

When the control valve has been shifted to the "intermediate" position the valve will conduct pressure oil behind the ring piston 45, thereby applying clutch B, which will lock the feed-back pinion 38 to the carrier 20, compelling the second planetary set Q to rotate as a unit. Its speed of rotation is, therefore, determined by the gear proportions of the first gear set P. In other words, the driven shaft 51 rotates at $6/10$ the speed of the internal gear 19. At stall of the turbine 12 the driven shaft 51 would receive a torque $2.1 \times 10/6 = 3.5$ times engine torque.

It is to be noted that to obtain "intermediate" drive ratio only clutch B was engaged and the simultaneous release of another control member was not necessary. The advance to the next speed ratio is preferably made automatically, by means now well known in the art and illustrated in my Patent No. 2,658,346.

D. Forward drive—direct

At the proper time the governor (not shown) will shift the control valve into the "direct" position and when so shifted will conduct pressure oil behind ring piston 44, thereby applying clutch A, which will lock member 43 to the internal gear 19. Since the second planetary gear set Q was previously locked up by clutch B, clutch A will lock up the first planetary gear set P, because carrier 20 is now locked to internal gear 19, hence reaction sun gear 31 will rotate forwardly and this is permitted by the overrunning clutch G without the release of the brake band 36 from the brake drum 34.

Again to be noted is the fact that only one additional control element was applied without a previous or simultaneous release of one or more other control elements. Provision of control (not shown) may also be made so that the operator may overrule the automatic shifting of the control valve to enable him to pass another vehicle in traffic, i. e. he may "down-shift" into the "intermediate" speed ratio.

E. Reverse drive

For reverse operation of the transmission the control valve (not shown) is shifted into the "reverse" position, whereby the brake band 30 is applied to the brake drum 23, while the brake band 36 is released from the brake drum 34. Pressure oil will also be conducted behind ring piston 44 to apply clutch A, thereby establishing a drive from the turbine 12 to the feed-back pinion 38.

Figure 1: Since carrier 20 is held from rotation by brake D, internal gear 50 will rotate in the reverse direction at reduced speed but increased torque.

Figure 2: With carrier 20 held by brake D the sun gear 228 is also held stationary. When the feed-back pinion 38 is driven by the turbine 12 the compound planetary pinions 252—253 planet around the stationary sun gear 228, causing the carrier 254 on the driven shaft 251 to turn in the "reverse" direction.

Figure 3: With the internal gear 328 of the carrier 20 held stationary, rotation of the feed-back pinion 38 in the forward direction will compel carrier 350 and the driven shaft 251 to turn in the "reverse" direction at reduced speed, but increased torque, as recorded under items 18—20 and 18—19 of Figure 6.

Internal gear 19 will rotate the reaction sun gear 31 reversely, but no power is transmitted through the first planetary gear set P.

Three forms of the invention have now been described in detail and obviously various modifications, rearrangements or minor improvements will suggest themselves to those skilled in the art. For example, the torque converter may be replaced by a fluid coupling or the band type brakes may be replaced by positive brakes.

It should further be understood that the gear proportions illustrated in this specification may be greatly varied to accommodate various operating conditions and such modifications shall come within the scope of the following claims.

I claim:

1. In a variable speed and torque transmission comprising in combination, a hydro-kinetic torque converter and two interconnected multiple element planetary gear sets, positioned between co-axial driving an driven shafts, the impeller of said converter being connected to said driving shaft, the turbine being connected to a first element of a first planetary gear set, the stator of said converter being free to rotate in the direction of the driving shaft only, a movable brake means, a second element of said first planetary gear set being connected to said movable brake means, and a third element of said first planetary gear set being connected to a first element of the second planetary gear set, a second element thereof being connected to the driven shaft, an overrunning clutch in cooperating relation with the third element of said second planetary gear set and the first element of said first planetary gear set, stationary brake means cooperating with said movable brake means and when applied thereto will cause the transmission to operate in the low forward gear ratio.

2. In a variable speed and torque transmission comprising in combination, a hydro-kinetic torque converter and two interconnected multiple element planetary gear sets, positioned between co-axial driving and driven shafts, the impeller of said converter being connected to said driving shaft, the turbine being connected to a first element of a first planetary gear set, the stator of said converter being free to rotate in the direction of the driving shaft only, a movable brake means, a second element of said first planetary gear set being connected to said movable brake means, and a third element of said first planetary gear set being connected to a first element of the second planetary gear set, a second element thereof being connected to the driven shaft, an overrunning clutch capable of transmitting torque from the third element of said second planetary gear set to the first element of said first planetary gear set, stationary brake means cooperating with said movable brake means and when applied thereto will cause the transmission to operate in the low forward ratio.

3. In a variable speed and torque transmission comprising in combination, a hydro-kinetic torque converter and two interconnected multiple element planetary gear sets, positioned between co-axial driving and driven shafts, the pump of said converter being connected to said driving shaft, the turbine being connected to a first element of a first planetary gear set, the stator of said converter being free to rotate in the direction of the driving shaft only, a movable brake means, overrunning clutch means between said movable brake means and the second element of said first planetary gear set, and a third element of said first planetary gear set being connected to a first element of the second planetary gear set, a second element thereof being connected to the driven shaft, an overrunning clutch capable of transmitting torque from the third element of said second planetary gear set to the first element of said first planetary gear set, stationary brake means cooperating with said movable brake means and when applied thereto will cause the transmission to operate in the low forward speed ratio.

4. In a variable speed and torque transmission comprising in combination, a hydro-kinetic torque converter and two interconnected planetary gear sets, each having a ring gear, a planet pinion carrier and a sun gear, positioned between co-axial driving and driven shafts, the pump of said converter being connected to said driving shaft, the turbine being connected to the ring gear of a first planetary gear set, the stator of said converter being free to rotate in the direction of the driving shaft only, a movable brake means, the sun gear of said first planetary gear set being connected to said movable brake means, and the planet pinion carrier of said first planetary gear set being connected to the planet pinion carrier of the second planetary gear set, the ring gear thereof being connected to the driven shaft, an overrunning clutch capable of transmitting torque from the sun gear of said second planetary gear set to the ring gear of said first planetary gear set, stationary brake means cooperating with said movable brake means and when applied thereto will cause the transmission to operate in the low forward speed ratio.

5. In a variable speed and torque transmission comprising in combination, a hydro-kinetic torque converter and two interconnected planetary gear sets, each having a ring gear, a planet pinion carrier and a sun gear, positioned between co-axial driving and driven shafts, the pump of said converter being connected to said driving shaft, the turbine being connected to the ring gear of a first planetary gear set, the stator of said converter being free to rotate in the direction of the driving shaft only, a movable brake means, the sun gear of said first planetary gear set being connected to said movable brake means, and the planet pinion carrier of said first planetary gear set being connected to the ring gear of the second planetary gear set, the planet pinion carrier thereof being connected to the driven shaft, an overrunning clutch capable of transmitting torque from the sun gear of said second planetary gear set to the ring gear of said first planetary gear set, stationary brake means cooperating with said movable brake means and when applied thereto will cause the transmission to operate in the low forward speed ratio.

6. In a variable speed and torque transmission comprising in combination, a hydro-kinetic torque converter and two interconnected planetary gear sets, the first gear set having a ring gear, a planet pinion carrier and a sun gear, the second gear set having two sun gears and a planet pinion carrier, positioned between co-axial driving and driven shafts, the pump of said converter being connected to the driving shaft, the turbine being connected to the ring gear of the first planetary gear set, the stator of said converter being free to rotate in the direction of the driving shaft only, a movable brake means, the sun gear of said first planetary gear set being connected to said movable brake means, and the planet pinion carrier of said first planetary gear set being connected to the first sun gear of the second planetary gear set, and the planet pinion carrier thereof being connected to the driven shaft, an overrunning clutch capable of transmitting torque from the second sun gear of said second planetary gear set to the ring gear of said first planetary gear set, stationary brake means cooperating with said movable brake means and when applied thereto will cause the transmission to operate in the low forward speed ratio.

7. In a variable speed and torque transmission comprising in combination, a hydro-kinetic torque converter and two interconnected multiple element planetary gear sets positioned between co-axial driving and driven shafts, the pump of said converter being connected to said driving shaft, the turbine being connected to a first element of a first planetary gear set, the stator of said converter being free to rotate in the direction of the driving shaft only, a movable brake means, overrunning clutch means between said movable brake means and the second element of said first planetary gear set, and a third element of said first planetary gear set being connected to a first element of the second planetary gear set, a second element thereof being connected to the driven shaft, an overrunning clutch capable of transmitting torque from the third element of said second planetary gear set to the first element of said first planetary gear set, and clutch coupling means on said third element of the second planetary gear set cooperating with clutch coupling means on said first and third elements of said first planetary gear set, and selective fluid actuating means for said clutch coupling means, stationary brake means cooperating with said movable brake means and when applied thereto will cause the transmission to operate in the low forward speed ratio, and when said third element of the second planetary gear set is clutched to the third element of the first planetary gear set the transmission will operate in the intermediate forward speed ratio, and when, in addition, said third element of the second planetary gear set is coupled to said first element of the first planetary gear set, the transmission will operate in the direct forward speed ratio.

8. In a variable speed and torque transmission comprising in combination, a hydro-kinetic torque converter and two interconnected planetary gear sets, each having a ring gear, a planet pinion carrier, and a sun gear, positioned between co-axial driving and driven shafts, the pump of said converter being connected to said driving shaft, the turbine being connected to the ring gear of a first planetary gear set, the stator of said converter being free to rotate in the direction of the driving shaft only, a movable brake means, overrunning clutch means between said movable brake means and the sun gear of said first planetary gear set, and the planet pinion carrier thereof being connected to the planet pinion carrier of the second planetary gear set, the ring gear thereof being connected to the driven shaft, an overrunning clutch capable of transmitting torque from the sun gear of said second planetary gear set to the ring gear of said first planetary gear set, and clutch coupling means on the sun gear of said second planetary gear set cooperating with clutch coupling means on said ring gear and planet pinion carriers, and selective fluid actuating means for said clutch coupling means, stationary brake means cooperating with said movable brake means and when applied thereto will cause the transmission to operate in the low forward speed ratio, and when said sun gear of the second planetary gear set is clutched to the planet pinion carriers the transmission will operate in the intermediate forward speed ratio, and when, in addition, said sun gear of the second planetary gear set is coupled to said ring gear of the first plnaetary gear set the transmission will operate in the direct forward speed ratiio.

9. In a variable speed and torque transmission comprising in combination, a hydro-kinetic torque converter and two interconnected planetary gear sets, each having a ring gear, a planet pinion carrier, and a sun gear, positioned between co-axial driving and driven shafts, the pump of said converter being connected to said driving shaft, the turbine being connected to the ring gear of a first planetary gear set, the stator of said converter being free to rotate in the direction of the driving shaft only, a movable brake means, overrunning clutch means between said movable brake means and the sun gear of said first planetary gear set, and the planet pinion carrier of said first planetary gear set being connected to the ring gear of the second planetary gear set, the planet pinion carrier of said second set being connected to the driven shaft, an overrunning clutch capable of transmitting torque from the sun gear of said second planetary gear set to the ring gear of said first planetary gear set, and clutch coupling means on the sun gear of said second planetary gear set cooperating with clutch coupling means on said ring gear and planet pinion carrier of the first planetary gear set, and selective fluid actuating means for said clutch coupling means, stationary brake means cooperating with said movable brake means and when applied thereto will cause the transmission to operate in the low forward speed ratio, and when said sun gear of the second planetary gear set is clutched to the planet pinion carrier of the first planetary gear set the transmission will operate in the intermediate forward speed ratio, and when, in addition, said sun gear of the second planetary gear set is coupled to said ring gear of the first planetary gear set the transmission will operate in the direct forward speed ratio.

10. In a variable speed and torque transmission comprising in combination, a hydro-kinetic torque converter and two interconnected planetary gear sets, the first gear set having a ring gear, a planet pinion carrier and a sun gear, the second gear set having two sun gears and a planet pinion carrier, positioned between co-axial driving and driven shafts, the pump of said converter being connected to said driving shaft, the turbine being connected to the ring gear of the first planetary gear set, the stator of said converter being free to rotate in the direction of the driving shaft only, a movable brake means, overrunning clutch means between said movable brake means and the sun gear of said first planetary gear set, the planet pinion carrier thereof being connected to the first sun gear of the second planetary gear set, and the planet pinion thereof being connected to the driven shaft, an overrunning clutch capable of transmitting torque from the second sun gear of said second planetary gear set to the ring gear of said first planetary gear set, and clutch coupling means on the second sun gear of said second planetary gear set cooperating with clutch coupling means on said ring gear and planet pinion carrier of the first planetary gear set, and selective fluid actuating means for said clutch coupling means, stationary brake means cooperating with said movable brake means and when applied thereto will cause the transmission to operate in the low forward speed ratio, and when said second sun gear of the second planetary gear set is clutched to the planet pinion carrier of the first planetary gear set the transmission will operate in the intermediate forward speed ratio, and when, in addition, said second sun gear of the second planetary gear set is coupled to said ring gear of the first planetary gear set the transmission will operate in the direct forward speed ratio.

11. In a variable speed and torque transmission comprising in combination, a hydro-kinetic torque converter and two interconnected multiple element planetary gear sets positioned between co-axial driving and driven shafts, the pump of said converter being connected to said driving shaft, the turbine being connected to a first element of a first planetary gear set, the stator of said converter being free to rotate in the direction of the driving shaft only, a first movable brake means, overrunning clutch means between said first movable brake means and the second element of said first planetary gear set, and a third element of said first planetary gear set being provided with a second movable brake means and connected to a first element of the second planetary gear set, a second element thereof being connected to the driven shaft, an overrunning clutch capable of transmitting torque from the third element of said second planetary gear set to the first element of said first planetary gear set, and clutch coupling means on said third element of the second planetary gear set cooperating with clutch coupling means on said first and third elements of said first planetary gear set, and selective fluid actuating means for said clutch coupling means, independent stationary brake means cooperating with said first and second movable brake means, and when said brake means are alternately applied to their respective movable brake means will cause the transmission to operate in low forward or low reverse speed ratio.

12. In a variable speed and torque transmission comprising in combination, a hydro-kinetic torque converter and two interconnected planetary gear sets, each having a ring gear, a planet pinion carrier, and a sun gear, positioned between co-axial driving and driven shafts, the pump of said converter being connected to said driving shaft, the turbine being connected to the ring gear of a first planetary gear set, the stator of said converter being free to rotate in the direction of the driving shaft only, a first movable brake means, overrunning clutch means between said first movable brake means and the sun gear of said first planetary gear set, the planet pinion carrier thereof being provided with a second movable brake means, and connected to the planet pinion carrier of the second planetary gear set, the ring gear thereof being connected to the driven shaft, an overrunning clutch capable of transmitting torque from the sun gear of said second planetary gear set to the ring gear of said first planetary gear set, and clutch coupling means on the sun gear of said second planetary gear set cooperating with clutch coupling means on said ring gear and planet pinion carriers, and selective fluid actuating means for said clutch coupling means, independent stationary brake means cooperating with said first and second movable brake means respectively, and when said stationary brake means are alternately applied to their respective movable brake means will cause the transmission to operate in the low forward or reverse speed ratio.

13. In a variable speed and torque transmission comprising in combination, a hydro-kinetic torque converter and two interconnected planetary gear sets, each having a ring gear, a planet pinion carrier, and a sun gear, positioned between co-axial driving and driven shafts, the pump of said converter being connected to the driving shaft, the turbine being connected to the ring gear of a first planetary gear set, the stator of said converter being free to rotate in the direction of the driving shaft only, a first movable brake means, overrunning clutch means between said first movable brake means and the sun gear of said first planetary gear set, the planet pinion carrier of said first planetary gear set being provided with a second movable brake means, and connected to the ring gear of the second planetary gear set, the planet pinion carrier thereof being connected to the driven shaft, an overrunning clutch capable of transmitting torque from the sun gear of said second planetary gear set to the ring gear of said first planetary gear set, and clutch coupling means on the sun gear of said second planetary gear set cooperating with clutch coupling means on said ring gear and planet pinion carrier of said first planetary gear set, and selective fluid actuating means for said clutch coupling means, independent stationary brake means cooperating with said first and second movable brake means respectively, and when said stationary braken means are alternately applied to their respective movable brake means will cause the transmission to operate in the low forward or reverse speed ratio.

14. In a variable speed and torque transmission comprising in combination, a hydro-kinetic torque converter and two interconnected planetary gear sets, the first gear set having a ring gear, a planet pinion carrier and a sun gear, the second gear set having two sun gears and a planet pinion carrier, positioned between co-axial driving and driven shafts, the pump of said converter being connected to said driving shaft, the turbine being connected to the ring gear of the first planetary gear set, the stator of said converter being free to rotate in the direction of the driving shaft only, a first movable brake means, overrunning clutch means between said first movable brake means and the sun gear of said first planetary gear set, the planet pinion carrier thereof being provided with a second movable brake means and connected to the first sun gear of the second planetary gear set, and the planet pinion carrier thereof being connected to the driven shaft, an overrunning clutch capable of transmitting torque from the second sun gear of said second planetary gear set to the ring gear of said first planetary gear set, and clutch coupling means on the second sun gear of said second planetary gear set cooperating with clutch coupling means on said ring gear and planet pinion carrier of said first planetary gear set, and selective fluid actuating means for said clutch coupling means, independent stationary brake means cooperating with said first and second movable brake means respectively, and when said stationary brake means are alternately applied to their respective movable brake means will cause the driven shaft to rotate in the low forward or reverse speed ratio.

15. In a variable speed and torque transmission comprising in combination, a hydro-kinetic torque converter and two interconnected multiple element planetary gear sets, positioned between co-axial driving and driven shafts, the pump of said converter being connected to said driving shaft, the turbine being connected to a first element of a first planetary gear set, the stator of said converter being free to rotate in the direction of the driving shaft only, a movable brake means, a second element of said first planetary gear set being connected to said movable brake means, and a third element of said first planetary gear set being connected to a first element of the second planetary gear set, a second element thereof being connected to the driven shaft, a first overrunning clutch between said driven shaft and said movable brake means, a second overrunning clutch capable of transmitting torque from the third element of said second planetary gear set to the first element of said first planetary gear set, stationary brake means cooperating with said movable brake means and when applied thereto will prevent backward rotation of said driven shaft at such times when the converter torque is negligible.

16. In a variable speed and torque transmission comprising in combination, a hydro-kinetic torque converter and two interconnected multiple element planetary gear sets, positioned between co-axial driving and driven shafts, the pump of said converter being connected to said driving shaft, the turbine being connected to a first element of a first planetary gear set, the stator of said converter being free to rotate in the direction of the drive shaft only, a movable brake means, a first overrunning clutch means between said movable brake means and the second element of said first planetary gear set, and a third element thereof being connected to a first element of the second planetary gear set, a second element being connected to the driven shaft, a second overrunning clutch between said driven shaft and said movable brake means, a third overrunning clutch means capable of transmitting torque from the third element of said second planetary gear set to the first element of said first planetary gear set, stationary brake means cooperating with said movable brake means and when applied thereto will prevent the backward rotation of said driven shaft at such times when the converter torque is negligible.

17. In a variable speed and torque transmission comprising in combination, a hydro-kinetic torque converter and two interconnected multiple element planetary gear sets, positioned between co-axial driving and driven shafts, the pump of said converter being connected to said driving shaft, the turbine being connected to a first element of a first planetary gear set, the stator of said converter being free to rotate in the direction of the driving shaft only, a movable brake means, a first overrunning clutch means between said movable brake means and the second element of said first planetary gear set, and a third element thereof being connected to a first element of the second planetary gear set, a second element thereof being connected to the driven shaft, a second overrunning clutch means between said driven shaft and said movable brake means, a third overrunning clutch means capable of transmitting torque from the third element of said second planetary gear set to the first element of said first planetary gear set, and clutch coupling means on said third element of the second planetary gear set cooperating with clutch coupling means on said first and third elements of said first planetary gear set, and selective fluid actuating means for said clutch coupling means, stationary brake means cooperating with said movable brake means, and when applied thereto will prevent the backward rotation of said driven shaft at such times when the converter torque is negligible.

18. In a variable speed and torque transmission comprising in combination, a hydro-kinetic torque converter and two interconnected planetary gear sets, positioned between co-axial driving and driven shafts, each gear set having a ring gear, a planet pinion carrier, and a sun gear, the pinions meshing with the ring and sun gears, the pump of said converter being connected to said driving shaft, the turbine being connected to the ring gear of a first planetary gear set, the stator of said converter being free to rotate in the direction of the driving shaft only, a first movable brake means, a first overrunning clutch means between said first movable brake means and the sun gear of said first planetary gear set, the planet pinion carrier thereof being provided with a second movable brake means and connected to the planet pinion carrier of the second planetary gear set, the ring gear thereof being connected to the driven shaft, a second overrunning clutch means between said driven shaft and said first movable brake means, a third overrunning clutch means capable of transmitting torque from the sun gear of said second planetary gear set to the ring gear of said first planetary gear set, and clutch coupling means on the sun gear of said second planetary gear set cooperating with clutch coupling means on said ring gear and planet carrier of the first planetary gear set, and selective fluid actuated means for energizing said coupling means, and independent stationary brake means cooperating with said first and second movable brake means respectively, and when said first movable brake means is restrained by its stationary brake means and the converter torque is negligible, said second overrunning clutch means will prevent the backward rotation of said driven shaft, and when said converter delivers considerable torque the transmission will operate in the low forward speed ratio, and when said sun gear of the second planetary gear set is clutched to the planet pinion carriers the transmission will operate in the intermediate forward speed ratio, and when, in addition, said last mentioned sun gear is coupled to the ring gear of the first planetary gear set the transmission will operate in the direct forward speed ratio; and when the second movable brake means is halted by its stationary brake means the transmission will operate in the reverse speed ratio.

19. Variable speed and torque mechanism for motor vehicles comprising in combination, a driving shaft and a driven shaft, two interconnected multiple element variable speed ratio planetary gear sets, a hydro-kinetic torque converter connected to the driving shaft and driving a first element of the first planetary gear set, said driven shaft connected to a first element of the second planetary gear set, a second element thereof feeding back torque to said first element of said first planetary gear set through a disconnectible means, a second element of said first planetary gear set serving as a reaction member, a first brake means to brake said reaction member, the third elements of both planetary gear sets being connected together, a second brake means to brake said connected elements, clutch coupling means on said second element of the second planetary gear set, and selective fluid actuated means to energize said coupling means to connect them separately or simultaneously to similar coupling means on said first element of the first planetary gear set or said connected elements.

20. The combination set forth in claim 19 in which means are provided to prevent rotation of said driven shaft in a direction opposite to that of the drive shaft when said first brake means restrains said reaction member, said means becoming automatically ineffective when said first brake means is released.

References Cited in the file of this patent

UNITED STATES PATENTS

| | | |
|---|---|---|
| 2,524,867 | Seybold | Oct. 10, 1950 |
| 2,609,706 | Jandasek | Sept. 9, 1952 |
| 2,645,137 | Roche | July 14, 1953 |